United States Patent [19]

Prejean

[11] Patent Number: 5,009,283
[45] Date of Patent: Apr. 23, 1991

[54] HUNTING STAND SYSTEM
[76] Inventor: Leonard W. Prejean, P.O. Box 529, Ville Platte, La. 70586
[21] Appl. No.: 484,220
[22] Filed: Feb. 23, 1990
[51] Int. Cl.$^5$ ............................ A45F 3/26; A47C 9/10
[52] U.S. Cl. .................................. 182/116; 182/187
[58] Field of Search ............... 182/187, 188, 116, 107, 182/93, 20, 21

[56] References Cited

U.S. PATENT DOCUMENTS

| | | | |
|---|---|---|---|
| 4,061,202 | 12/1977 | Campbell | 182/187 |
| 4,552,246 | 11/1985 | Thomas | 182/187 |
| 4,552,247 | 11/1985 | Purdy | 182/187 |
| 4,614,252 | 9/1986 | Tarner | 182/187 |
| 4,742,888 | 5/1988 | Amacker | 182/116 |
| 4,787,476 | 11/1988 | Lee | 182/116 |
| 4,802,552 | 2/1989 | Williams | 182/187 |
| 4,905,792 | 3/1990 | Wilson | 182/187 |

OTHER PUBLICATIONS

Cabela's 1989 Fall Catalog, pp. 139–142.
Bass Pro Shops, 1989 Catalog, pp. 71–74.
Papes Distributor, 1989 Catalog, pp. 80–84.

Primary Examiner—Reinaldo P. Machado
Attorney, Agent, or Firm—William D. Kiesel; Robert C. Tucker; Timothy J. Monahan

[57] ABSTRACT

A versatile hunting stand is provided which may be supported by a tree, ladder or tripod. The stand has a collapsible seat assembly which serves as a foot bar when used as a climbing stand. Adjustable arms may be used as a component of the climbing bar assembly or when a ladder is connected to the front of the stand, the arms may be used to brace the ladder. Instead of supporting the back end of the stand against a tree, tripod legs may be inserted into sockets in the stand.

39 Claims, 6 Drawing Sheets

HUNTING STAND SYSTEM

BACKGROUND OF THE INVENTION

1. Field of the Invention

This invention is generally related to portable platforms which are set up in the wild by hunters. The platforms or stands as they are more commonly known, are supported at a desired elevation by either a tree or a tripod supplied with the stand.

2. Prior Art

The desirability of hunting game animals from a perch above the surrounding terrain is well known. An elevated stand allows a hunter to see over the surrounding undergrowth and increases the territory one may keep under surveillance. Likewise, when viewed from above, the undergrowth usually appears less dense than at eye level. Furthermore, the senses of most wild game, and especially deer, are attuned to dangers at ground level. A hunter in a stand is less likely to be detected by his quarry.

Stands may be generally categorized as free standing stands, tree stands or ladder stands which lean against a tree. The first category, free standing stands, have a platform mounted on top of a tripod or step ladder support, at a height of 10 to 16 feet. The platform typically has a chair or seat which rotates 360°. This type of stand is particularly useful when hunting in brushy areas devoid of mature trees.

The largest and most diverse category includes those stands which are secured to the trunk of a tree, namely tree stands. Examples of various tree stands may be found in the more popular sporting goods catalogs such as Cabela's ® published by Cabela's Inc., Sidney, Nebraska. The majority of the tree stands have a platform with one end abutting the tree trunk. A bracket extending upward from the platform may encircle the tree or provide a point of attachment for a strap or chain which in turn encircles the tree. Alternatively, a pin or hook is screwed into the tree trunk and the stand is hung from the hook.

One variation of tree stand in which a bracket extends from the platform and encircles the tree is referred to as a climbing tree stand. The stand may be used in conjunction with a second device known as a "hand climber" or climbing aid to climb up a tree. An example of a climbing tree stand and ancillary equipment is disclosed in Williams, U.S. Pat. No. 4,802,552.

Ladder stands are a cross between free standing stands and tree stands. A platform is supported at one end by a chain or rope encircling the trunk of the tree and at the opposite end by a ladder. A strap is often provided connecting the ladder to the tree about midway between the platform and the ground. The ladder may fold up or break down into interlocking sections to facilitate transportation through the woods.

The hunting stands described above are designed to be supported by a single method. For example, a climbing stand may not be readily converted to a tripod stand or ladder stand. Another shortcoming of some of the climbing tree stands is that they are unsafe, especially if one has to step to the side of the platform when lifting or folding up the seat. Further, many prior art climbing stands allow a hunter to approach too close to the back end of the platform causing the stand to disengage from the tree and free fall downward. In general, the prior art stands lack versatility, fail to employ multifunctioning parts and are relatively dangerous.

SUMMARY OF THE INVENTION

Therefore, one of the objects of this invention is to provide a hunting stand which is safe and easy to use.

Another object of this invention is to provide a stand which can employ a variety of supports including trees, tripods and ladders.

Another object of this invention is to provide a stand which minimizes the number of individual parts required for operation by introducing parts which serve more than one function or are easily convertible to another use.

Still another object of this invention is to provide a stand which is easily assembled with interlocking parts. Whenever possible, the use of fasteners which might be dropped or easily lost has been avoided.

Another object of this invention is to provide a stand which is lightweight and compact when disassembled for easy transportation.

Yet another object of this invention is to provide a stand which is versatile and easily adjustable to variations in tree diameter, the lean of a tree, terrain and even the type of footwear worn by a hunter when the stand is used to climb a tree.

Accordingly, a hunting stand is provided having a platform with a front end and a back end, the back end having vertical cleats to grip a tree and prevent the platform from swaying. A section of female tubing is connected on each side of the platform and an adjustable arm is insertable in each of the sections to either project upward for attachment of a climbing bar around a tree or downward for attachment to a ladder connected to the front of the platform. A seat assembly is connected to the back end of the platform and has a post which pivots between an upright position perpendicular to the platform and collapsed position folded down to the front of the platform. A crossbar connected perpendicular to the seat assembly post can be engaged by a person's feet when the seat assembly is in a collapsed position to lift the tree stand while climbing a tree. When the seat assembly is in an upright position, knobs on each end of the crossbar engage ears braced on either side of the platform to secure the seat assembly.

The hunting stand may be supported by a tree as a climbing stand, pin-mounted stand or hanging stand. Alternatively, the ladder may be connected to the front of the stand and engage with the adjustable arms extending downward from the platform. The platform is supported at its back end by a strap encircling the trunk of tree or by legs inserted into sockets in the back end of the platform. A stabilizing bar is pivotally connected at one of its ends to the ladder, midway up, facing the back end of the platform. The opposite end of the stabilizing bar may either be engaged with the tree or the tripod legs depending upon which is supporting the back end of the platform.

DESCRIPTION OF THE PREFERRED EMBODIMENT OF THE INVENTION

Without limiting the scope of the invention, the preferred features of the invention are hereinafter set forth.

The stand may be supported by any one of five different mounting methods, namely as a climbing stand, hanging stand, pin-mounted stand, ladder stand or tripod stand. Each of the methods will be discussed in detail below. The stand is designed to be convertible from one mounting method to another with the minimum requirement of additional parts. The stand and ancillary parts are manufactured from aluminum for its strength and light weight. Most of the adjoining components of the stand which are stationary relative to each other are welded together.

Figure 1:
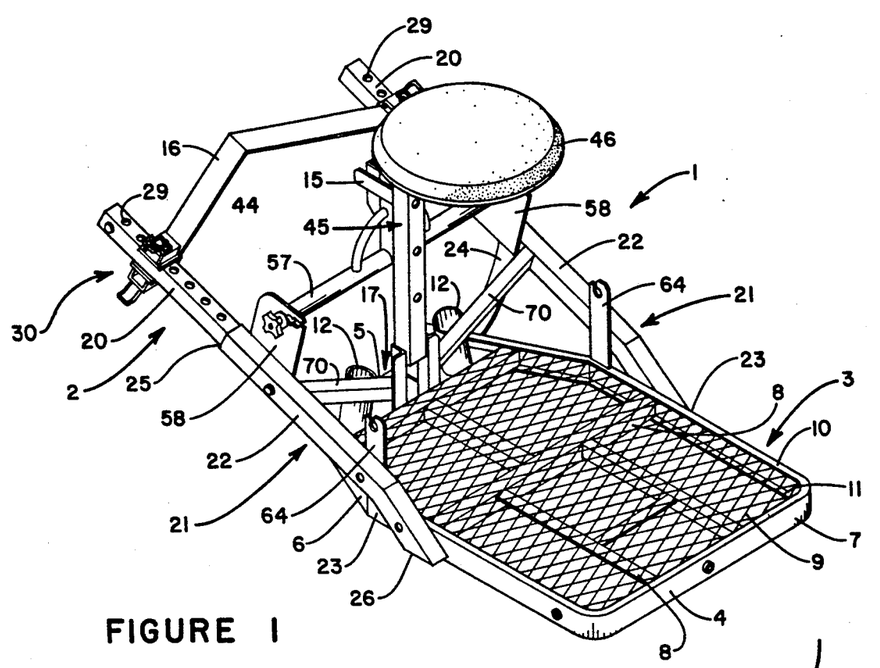
FIG. 1 is a perspective view of the stand with climbing bar assembly.

Referring to FIG. 1, stand 1 is shown with climbing bar assembly 2. The foundation of stand 1 is rectangular platform 3 having front end 4 and back end 5. The circumference 6 of platform 3 is outer frame 7 having a "C" shaped cross section formed by upper edge 10 and lower edge 11 bent inward. Reinforcing bars 8 cross link outer frame 7 and provide a framework below grate 9 which covers the top surface of platform 3. Grate 9 is overlapped at its periphery by the upper edge 10 of outer frame 7. Adjacent back end 5, platform 3 has sockets 12 for use with tripod mounting which will be discussed in detail at a later point.

When stand 1 is positioned on a tree 13 as shown in FIGS. 7, 9, 11 and 12, back end 5 of platform 3 abuts the outer surface of the tree's trunk. The front end 4 of platform 3 extends away from tree 13 into midair resulting in a downward directed torque on platform 3 in the direction of arrow 14. The torque is counteracted by climbing bar assembly 2 which encircles tree 13 at a height above platform 3. The effect of the forces acting on stand 1 cause the back end 5 of platform 3 to be urged against tree 13. Likewise climbing bar 16 is urged against the opposite side of tree 13.

Figure 2:
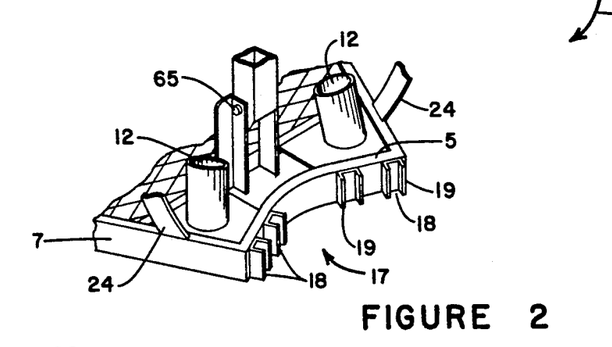
FIG. 2 is detailed view of the vertical cleats at the back end of the platform.

The back end 5 of platform 3 is provided with tree engaging means 17 to provide traction on tree 13, shown in detail in FIG. 2. The back end 5 is concave to correspond to a shape of tree 13 and prevent stand 1 from tilting. Back end 5 could also be "V" shaped with the apex of the "V" directed inward. Additionally, traction means 17 comprises vertically aligned cleats 18 spaced around back end 5 The edges 19 of cleats 18 are vertical bars perpendicular to frame 7 which press against the bark of tree 13 to prevent stand 1 from sliding downward. The alignment of cleats 18 also prevents stand 1 from swaying or rotating about tree 13 should a hunter lean to one side of platform 3.

Figure 3:
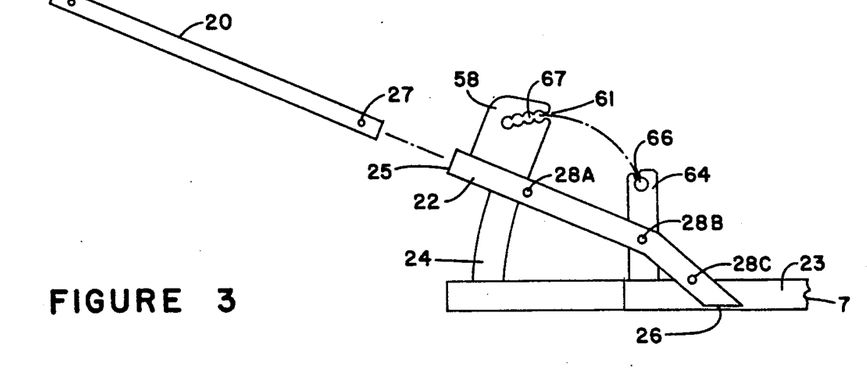
FIG. 3 is a detailed view of the ears for locking the seat assembly.
Figure 7:
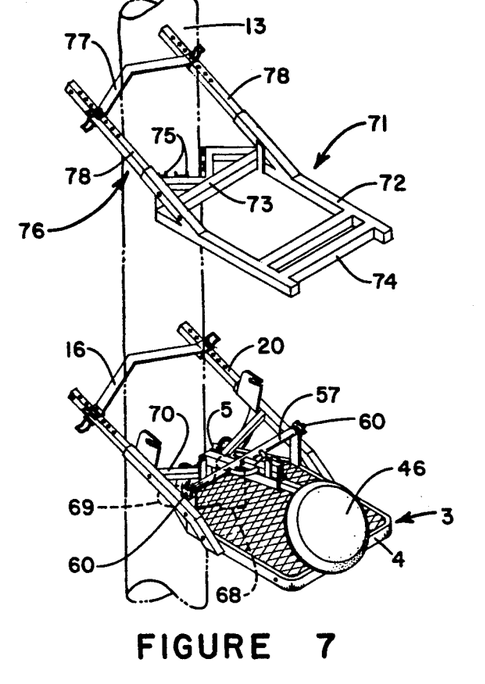
FIG. 7 is a perspective view of the stand with climbing bar assembly engaging a tree and the hand/seat climber engaging a tree.
Figure 8:
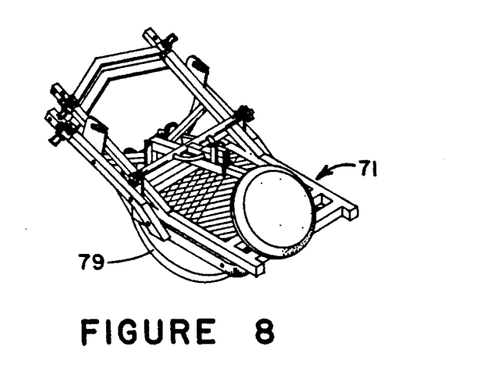
FIG. 8 is a perspective view of the stand and hand-/seat climber folded together for transportation.

Climbing bar 16 is convex or "V" shaped to engage the opposite side of tree 13 from platform 3. Climbing bar assembly 2 also includes arms 20 for adjustably engaging each end of climbing bar 16 and receiving means 21 positioned on each side of platform 3 to engage arms 20. In a preferred embodiment, receiving means 21 are sections of square female tubing 22 connected to sides 23 of platform 3. Braces 24 maintain tubing 22 at an angle relative to platform 3 sloping upward from front end 4 to back end 5. Referring to FIG. 3 each section of tubing 22 has an upper opening 25 and a lower opening 26 for receiving an end of arm 20. Each end of arm 20 is provided with a spring loaded pin 27 which may engage holes 28A and 28B when inserted in upper opening 25 of tubing 22 and hole 28C when inserted in lower opening 26 of tubing 22. Arms 20 may be extended when climbing bar assembly 2 engages tree 13 as shown in FIGS. 1 and 7 or retracted for transportation as shown in FIG. 8 by adjusting pin 27 to either hole 28A or 28B respectively.

Figure 4:
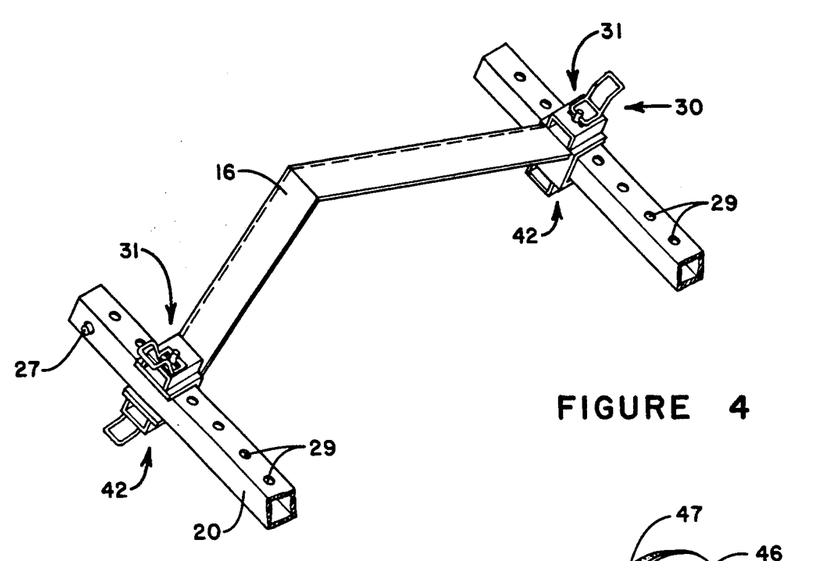
FIG. 4 is a perspective view of the adjustable locking pin assembly and climbing bar.

For any particular tree trunk, the relative distance between climbing bar 16 and back end 5 of platform 3 controls the horizontal alignment of platform 3. Therefore, for finer adjustments of the orientation of platform 3, climbing bar 16 may be engaged with arms 20 in a variety of positions shown in FIG. 4. Each of arms 20 have holes 29 aligned on the upper and lower sides of arms 20. At each end of climbing bar 16 are means to engage arms 20 along holes 29. The arm engaging means are designated generally as 30. An additional feature of climbing bar assembly 2 is that climbing bar 16 may be disengaged from arms 20 to initially engage a tree to be climbed.

Figure 5:
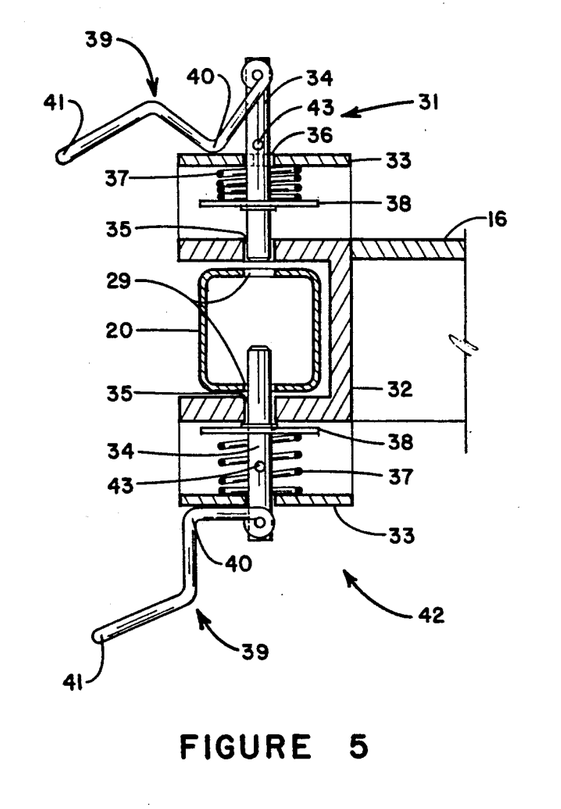
FIG. 5 is a cross section of the locking pin assembly.

In a preferred embodiment, arm engaging means 30 on the ends of climbing bar 16 is locking pin assembly 31 shown in detail in FIG. 5. Pin assembly 31 has bar channel 32 connected to climbing bar 16 and matingly slidable over arm 20. Bar channel 32 may be integrally formed with climbing bar 16 or welded thereto. An inverted "U" shaped bracket 33 is connected to bar channel 32 overlaying holes 29 in arm 20. Pin 34 is slidable through hole 35 in bar channel 32 and through slotted hole 36 in bracket 33. Pin 34 is urged downward into holes 29 in arm 20 by spring 37 which is compressed between an underside of bracket 33 and washer 38. Snap ring 38 engages pin 34 below washer 38 to prevent washer 38 from sliding relative to pin 34. A suitable lever 39 is inserted through the end of pin 34 protruding through bracket 33. Lever 39 is bent to create fulcrum 40 which causes pin 34 to be lifted when end 41 of lever 39 is depressed. The opposite side of bar channel 32 is also provided with locking pin assembly 42 which is a mirror image of locking pin assembly 31 and engages holes 29 on the under side of arms 20. Levers 39 of locking pin assemblies 31 and 42 may be simultaneously depressed on each side of climbing bar 16 to adjust the fit to tree 13.

It is possible to lock pin 34 in either a retracted position or extended position relative to holes 29 in arm 20. Pin 34 has cross piece 43 inserted through pin 34 at a point immediately below the underside of bracket 33 when pin 34 is in an extended position. The length of cross piece 43 corresponds to the length of slotted hole 36 in bracket 33. It can be seen that rotating pin 34 by 90° will either allow or prevent retraction of pin 34. Once pin 34 is retracted, pin 34 may be rotated 90 to prevent cross piece 43 and pin 34 from sliding through slotted hole 36. The aforementioned locking mechanism is useful as a safety device to restrict pins 34 and thus climbing bar 16 from disengaging from arms 20. Similarly, the locking mechanism allows pins 34 to be locked in a retracted position for adjustments or removal of climbing bar 16 from arms 20.

Figure 6:
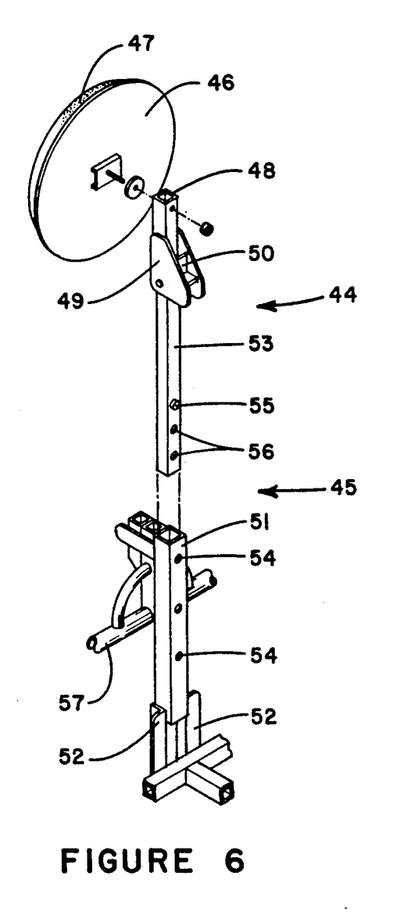
FIG. 6 is an exploded view of the seat assembly.

Referring to FIG. 1 and 6, stand 1 is also provided with seat assembly 44 connected adjacent the back end 5 of platform 3. Seat assembly 44 has post 45 with a lower end pivotally connected to platform 3 and seat 46 mounted at a top end of post 45. Seat 46 has a round cushion 47 which may be swivel mounted on an end of extension 48. An opposite end of extension 48 is pivotally connected to the top end of post 45 and reinforced by bracket 49. Stop 50 supported by bracket 49 aligns seat 46 parallel to platform 3 when seat assembly 44 is in an upright position.

Post 45 is adjustable to raise and lower seat 46. An exploded view of post 45 is shown in FIG. 6. Post 45 has square female tubing 51, a lower end of which is pivotally connected to reinforced forks 52 extending upward from platform 3. Post 45 also has square male tubing 53 which is slidable in female tubing 51. The upper end of male tubing 53 is connected to seat 46. Female tubing 51 has three holes 54 which are engaged by spring pin 55 being inserted insert in one of three holes 56 in male tubing 53. The choice of positions for pin 55, three positions each in female tubing 51 and male tubing 53, provides for nine possible settings for seat assembly 44. Those with skill in the art will recognize that a support for seat 46 may comprise a plurality of posts arranged on platform 3.

Figure 15:
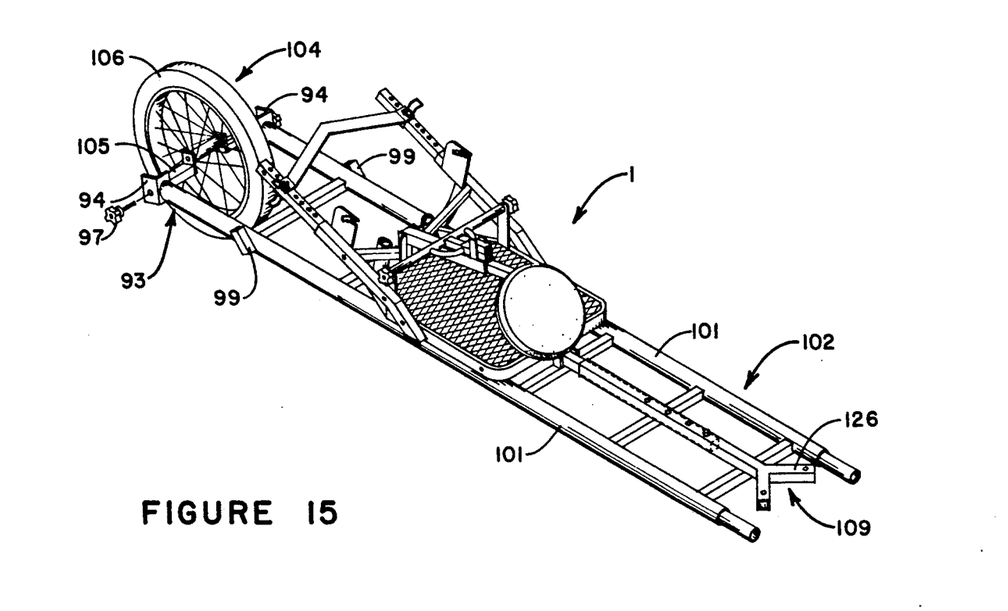
FIG. 15 is a perspective view of the stand and ladder with wheel assembly for transportation.

Seat assembly 44 may pivot from an upright position as shown in FIG. 1 to a collapsed position next to platform 3 as shown in FIGS. 7, 8 and 15. Seat assembly 44 may be secured in an upright position by engaging cross bar 57 with upper ears 58. Cross bar 57 is connected perpendicular to post 45 and in particular approximately midway on the back side of female tubing 51. Each end of cross bar 57 is threaded to accept bolt 59 which is mounted on knob 60. Upper ears 58 have slots 61 with enlarged circular openings 62 centered along slot 61 as shown in detail in FIG. 3. Knob 62 has bushing 63 which fits into circular openings 62 to lock seat assembly 44 in an upright position. In a preferred embodiment one of circular openings 62 is positioned to align post 45 perpendicular to platform 3. Alternatively, if bushing 63 is not aligned with one of circular openings 62, upper ear 58 may be clamped between the end of cross bar 57 and the face of bushing 63. Upper ears 59 are shown connected to female tubing 22 of arm receiving means 21. Upper ears 58 could alternatively be braced in position by other means.

Cross bar 57 of seat assembly 44 may engage lower ears 64 when in a collapsed position. Lower ears 64 extend upward from each side of platform 3 at the same radius from the pivot point 65 of post 45 as upper ears 58. Each of lower ears 64 has slots 66 and an enlarged circular opening 67 to accommodate bushing 63 in the same manner set forth in the description of upper ears 58.

Referring to FIG. 7, stand 1 is shown in its climbing mode. Seat assembly 44 is in a collapsed position engaging lower ears 64. Climbing bar assembly 2 encircles tree 13. A hunter desiring to climb the tree may stand facing tree 13 with his feet 68 underneath cross bar 57. The ends 69 of hunter's feet 68 may be slipped underneath toe bars 70 which are angled upward from forks 52 to join female tubing 22 of climbing bar assembly 2. Toe bars 70 reinforce and brace female tubing 22. Additionally, toe bars 70 provide a second point of contact for hunter's feet 68 to better control the angle of platform 3 when climbing or descending tree 13. Toe bars 70 are angled relative to platform 3 and may accommodate a range of shoe sizes should the hunter be wearing sneakers or heavy boots. Further, toe bars 70 along with sockets 12 guard hunter's feet 68 from being pinched between tree 13 and back end 5 of platform 3 while climbing. Toe bars 70 and sockets 12 also discourage a hunter from standing too close to back end 5 of platform 3 and causing stand 1 to disengage from tree 13. Loss of leverage against tree 13 will cause stand 1 to free fall down tree 13, a major cause of accidents.

In a preferred embodiment, when cross bar 57 is engaging lower ears 58 in a collapsed position, cross bar 57 is above the center of gravity of stand 1, i.e., the front end 4 and back end 5 will balance. Consequently, a hunter whose feet 68 simultaneously engage cross bar 57 and toe bars 70 can easily tilt platform 3 to engage and disengage tree 13. An elastic chord may be stretched across the back of hunter's feet 68 to urge feet 68 under cross bar 57. The elastic chord prevents stand 1 from slipping off of feet 68 when stand 1 is tilted during climbing. Although the balance of platform 3 may change depending on the extension of climbing bar assembly 2, the shift in balance can be counteracted by extending male tubing 53 of seat assembly 44.

As shown in FIG. 7, stand 1 is used with hand/seat climber 71 to scale tree 13. Hand/seat climber 71 has rectangular frame 72 with front end 73 and back end 74 engaged with tree 13. Cleats 75, similar to those provided at back end 5 of platform 3, are vertically aligned around the concave or "V" shape of back end 73. Hand/seat climber 71 has a climbing bar assembly 76 with detachable climbing bar 77 and telescoping arms 78. Climbing bar 77 may employ means to engage arms 78 such as locking pin assembly 31 described in detail above. Likewise, telescoping arms 78 may use a male and female tubing arrangement as set forth in the description of climbing bar assembly 2 of stand 1.

The use of hand and seat climbers in conjunction with climbing tree stands is well known. Briefly, a hunter stands on platform 3 facing tree 13 with his feet 68 under cross bar 57 and toe bars 70. The upper body of the hunter is inside rectangular frame 72 of hand/seat climber 71. While supporting his weight on frame 72, the hunter contracts his legs, tilting platform 3 and pulling stand 1 upward. The hunter then transfers his weight to platform 3 which causes back end 5 and climbing bar 16 to grip or bite into tree 13. Since the vertical distance between stand 1 and hand/seat climber 71 has decreased, the hunter can tilt hand/seat climber 71 and raise it higher up the tree. The process is repeated until the desired height is reached.

Once one has reached a desired height, seat assembly 44 can be pivoted to an upright position. Unlike, many prior art stands which require the hunter to step to the side of the platform when raising a seat, a hunter may straddle post 45, lifting it up between his legs. Thus, a significant improvement in the safety of climbing tree stands is achieved. It is also important to note that cross bar 57 is raised leaving platform 3 unobstructed when seat assembly 44 is upright, enlarging usable space.

Stand 1 and hand climber 71 can be easily packed through the woods. Referring to FIG. 8, the width of hand climber 71 is slightly less than the distance between female tubing 22 of climbing bar assembly 2. Hand/seat climber 71 may be nested in stand 1 and seat assembly 44 may be collapsed to prevent hand/seat climber 71 from disengaging. The bottom side of platform 3 has shoulder straps 79 for packing the combined unit. Reinforcing bars 8 on the underside of platform 3 are spaced to lie between a hunter's shoulder blades when platform 3 is strapped on like a pack. Of course, arms 20 may be retracted when transporting stand 1.

Figure 9:
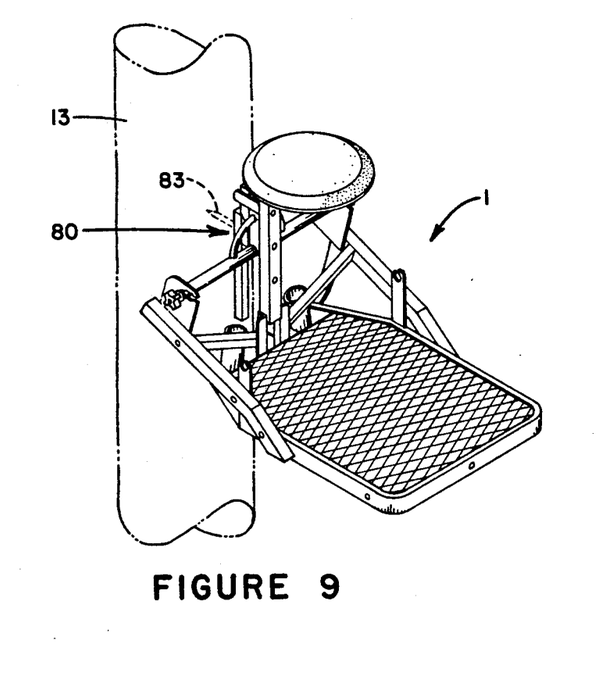
FIG. 9 is a perspective of the stand using a pin mount.
Figure 10:
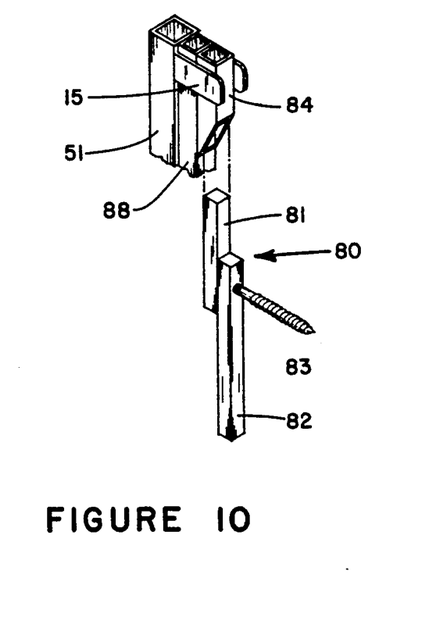
FIG. 10 is an exploded view of the pin assembly.

Stand 1 is engineered to be mounted on a tree by means other than climbing bar assembly 2. One alternate method is to use a pin mount as shown in FIG. 9. Referring to FIG. 10 pin assembly 80 is screwed into tree 13 at a desired height. Pin 81 extends upward, spaced a slight distance from tree 13. Base 82 extends downward from screw 83 and provides leverage to counteract torque on pin 81. Seat assembly 44 has pin receiver 84 shown in detail in FIG. 10 connected to the back side of post 45 which can be slipped over pin 81. Once stand 1 is hanging from pin assembly 80, platform 3 can be leveled by adjusting the position of cross bar 57 in upper ears 58 and tightening knobs 60.

Figures 11, 12:
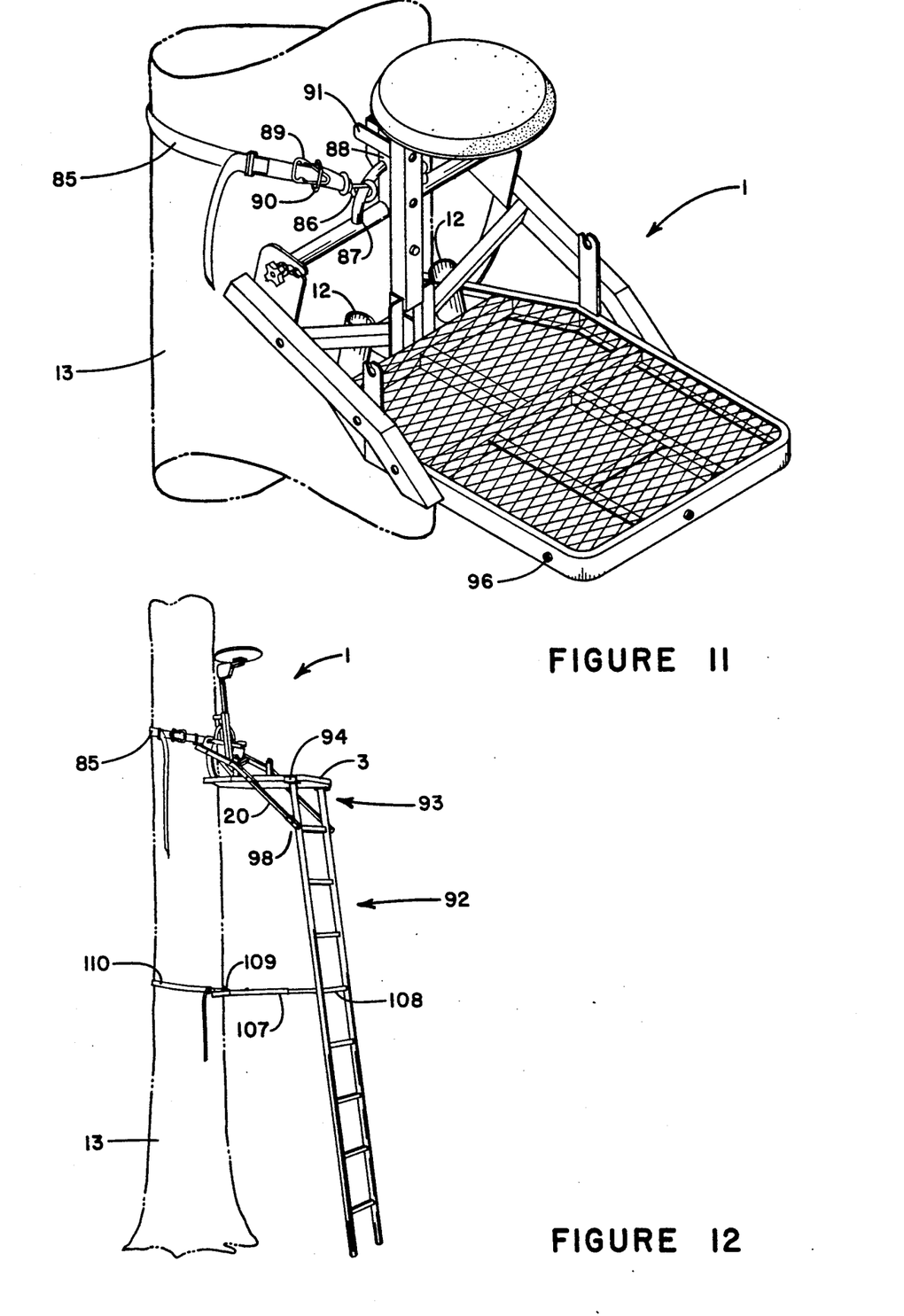
FIG. 11 is a perspective of the stand using a hanging mount.
FIG. 12 is a perspective view of the stand on a tree with ladder attached.

Referring to FIG. 11, stand 1 is shown hang mounted on tree 13. Adjustable belt 85 has clasps 86 at each end which engage ring 87 on seat assembly 44. Ring 87 is a continuous semi-circle of tubing which is welded at each end to cross bar 57. Vertical shaft 88 extends perpendicularly from cross bar 57 and is welded to the back side of female tubing 51 of post 45. Ring 87 is inserted into shaft 88 for additional support. Pin receiver 84 may be welded to the back side of shaft 88 for pin mounting stand 1 as discussed above. Clasps 86 may be carabiners used by mountain climbers. Preferably, clasps 86 have a spring action to maintain them in a locked position. Belt 85 may be made of the webbing used for vehicle seat belts.

After stand 1 has been positioned on tree 13 in the hanging mode, slack may be taken up in belt 85 by pivoting binder 89 through 180° and securing the end of binder 89 with slip ring 90. Binder 89 is designed to pivot forward, towards the hunter, for safety purposes. Additional stability in the hanging mode is achieved as cleat 91 on the back of post 45 is urged against tree 13 by belt 85. In a preferred embodiment cleat 91 is formed by bars 15 welded to the sides of shaft 88 and pin receiver 84 as shown in FIG. 10. Platform 3 can be levelled by adjusting the position of cross bar 57 relative to upper ears 58.

Figure 13:
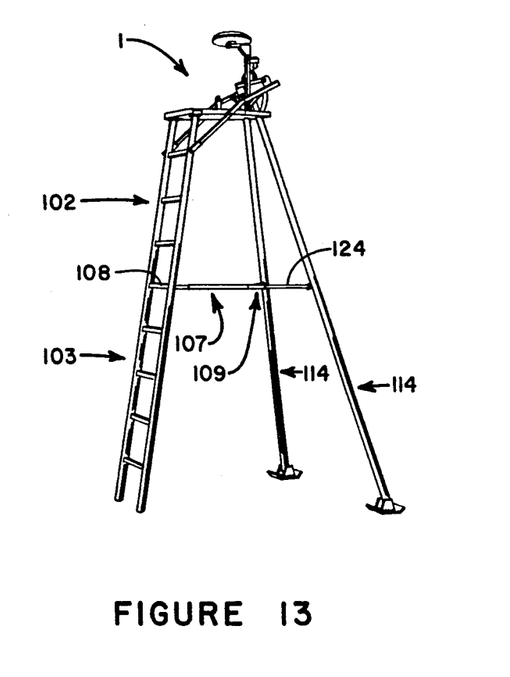
FIG. 13 is a perspective view of the stand mounted on a tripod.

Two additional methods of supporting stand 1, namely ladder mounting and tripod mounting, are shown in FIGS. 12 and 13 respectively. In both of the aforementioned cases, ladder 92 is connected at its upper end 93 to front end 4 of platform 3. Ladder 92 has angled rests 94 at either side of upper end 93. The vertical side of rest 94 has bolt 95 threaded through which engages threaded opening 96 in frame 7 of platform 3. Knobs 97 are provided for turning bolts 95 by hand.

Referring to FIG. 12, back end 5 of platform 3 is urged against tree 13 by belt 45. Pivoting binder 89 is particularly advantageous to take up slack when using ladder 92. Unlike use of stand 1 in a hang mount, sliding platform 3 down tree 13 may cause stand 1 to become unlevel.

Figure 14:
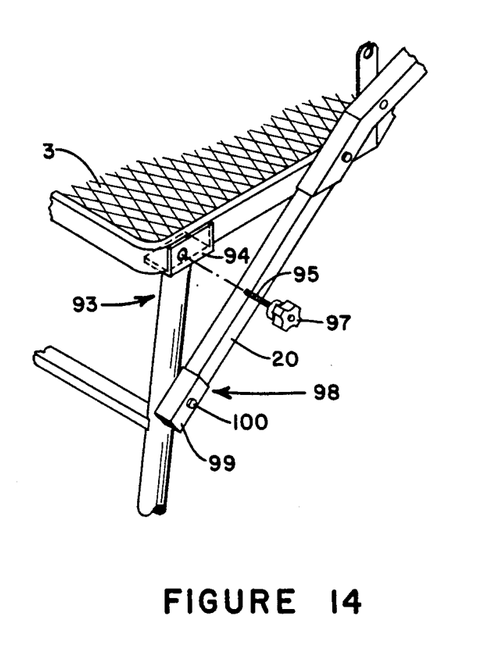
FIG. 14 is a detailed perspective view of the connection between the stand and ladder.

A unique feature of stand 1 is that arms 20 which are used with climbing bar assembly 2 may be inserted in receiving means 21 from below to brace ladder 92. Each of arms 21 have spring pins 27 at both ends. One end of arm 20 can be inserted in lower opening 26 of female tubing 22 for pin 27 to engage hole 28C as shown in FIG. 14. The opposite end of arm 20 engages receiving means 98 on the sides of ladder 92. Receiving means 98 are sections of female tubing 99 which are located below upper end 93 near the top rung of ladder 92. Female tubing 99 has hole 100 to engage pin 27 of arm 20.

Ladder 92 may be broken down for transportation or if so desired to install stand 1 at an intermediate height. As shown in FIG. 15, the sides of ladder 92 are made of pipes 101 which may be broken down into an upper section 102 and lower section 103. Dowels 104 protrude from pipes 101 of upper section 102 and are insertable in lower section 103. To further facilitate transportation, wheel assembly 104 is attachable to upper end 93 of ladder 92. In particular, axle 105 has ends with threaded openings to accept bolts 95 of rests 94. The entire stand 1, ancillary equipment and even killed game can be balanced on wheel 106 by a hunter holding dowels 104 as one would hold the handles of a wheel barrow.

Figure 16:
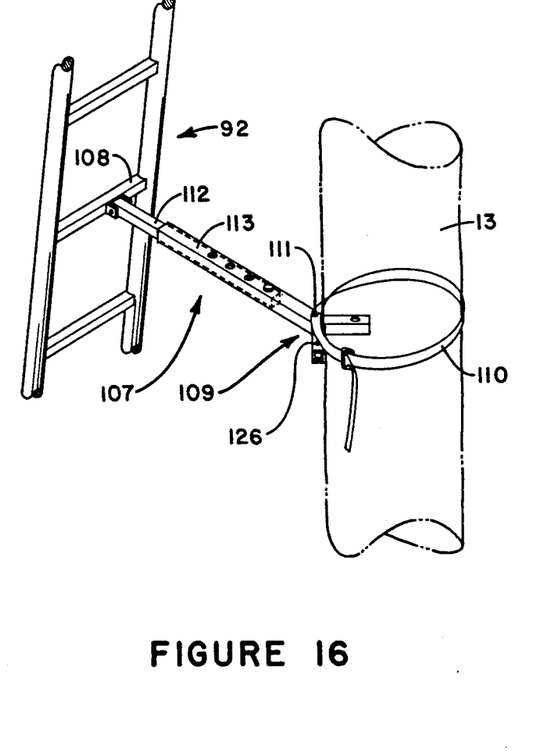
FIG. 16 is a rear perspective view of the stabilizing bar engaging a tree.

Referring back to FIG. 12, ladder 92 is provided with stabilizing bar 107 having an end pivotally connected to rung 108. The freely swinging end of stabilizer bar 107 has a "Y" shaped female connector 109 for connection to horizontal arms on the tripod legs which will be discussed in greater detail below. However, when stand 1 is partially supported by both a tree and ladder, "Y" connector 109 abuts tree 13 and is held in place by strap 110 threaded through loop 111 shown in FIG. 16. Stand 1 is further stabilized by connecting belt 85 to ring 87 of seat assembly 44 as when hanging stand 1 from tree 13. Stabilizer bar 107 has telescoping male and female tubing 112 and 113, respectively, to accommodate various distances between rung 108 and tree 13 and to retract for transportation. Male tubing 112 and female tubing 113 may be locked in place using the pin and hole arrangement disclosed in detail above.

Stand 1 may be converted from a ladder stand shown in FIG. 12, to a tripod stand shown in FIG. 13 by inserting legs 114 into platform 3. Legs 114 are shown in detail in FIG. 17. The top end of each of legs 114 have dowels 115 which are inserted into sockets 12 of platform 3. Legs 114 may be broken down into a plurality of sections 116A and 116B employing the pipe and dowel method used for ladder 92. The lower section 116A of leg 114 telescopes to accommodate variations in the terrain. Lower section 116A has male pipe 117 with one end pivotally connected to foot 118 and an opposite end inserted into female pipe 119. Male pipe 117 is locked into place with set screw 120 through hole 121 in the side of female pipe 119. Set screw 120 has knob 122 for adjustment without tools. Bracket 123 overlying hole 121 supports set screw 120 in position.

Figure 17:
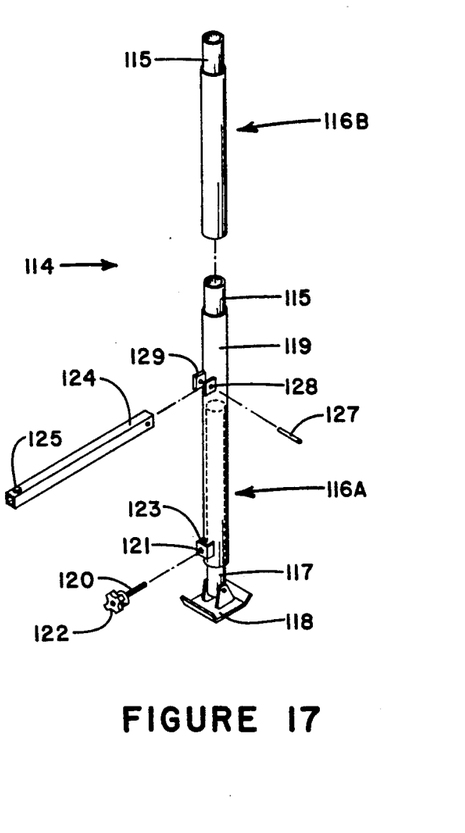
FIG. 17 is a partially exploded view of a tripod leg.

Each of legs 114 by pin 127 which fits through openings 128 of parallel shoulder pieces 129 extending from leg 114 has a stabilizing arm 124 with an end pivotally connected to leg 114 at a height corresponding to rung 108 of ladder 92. The opposite end of stabilizer arm 124 has a retractable pin 125 which engages an opening 126 in "Y" connector 109 of stabilizer bar 107 when inserted therein.

For transportation purposes, legs 114 may be broken down and placed on upper section 102 of ladder 92 along with stand 1 as shown in FIG. 15. An elastic chord or strap not shown may be used to secure the load such as strap 110 of stabilizing bar 107.

There are, of course, many alternate embodiments and modifications which are intended to be included within the scope of the following claims.

What I claim is:

1. A stand for supporting a hunter in a tree, comprising:
   a platform having a front end and a back end, said back end having means for traction on said tree;
   a climbing bar assembly having a first end and second end connected to said platform, said climbing bar assembly forming a loop extending past said back end of said platform and positioned to engage said tree at a height above said platform;
   a seat assembly having a post pivotally connected at one end to said platform, a seat connected to an opposite end of said post, said seat assembly being adjustable from an upright position to a collapsed position relative to said platform; and
   means connected to said seat assembly for engaging said hunter's feet when said seat assembly is in a collapsed position.

2. A stand according to claim 1 wherein said feet engaging means comprises a crossbar connected to said post.

3. A stand according to claim 2 wherein said crossbar is aligned perpendicular to said post, said crossbar lying spaced above said platform and parallel thereto when said seat assembly is in a collapsed position.

4. A stand according to claim 3 further comprising means connected to said platform for locking said seat assembly in an upright position.

5. A stand according to claim 4 wherein said crossbar has means on each end to engage said seat assembly locking means.

6. A stand according to claim 5 further comprising means connected to said platform for locking said seat assembly in a collapsed position.

7. A stand according to claim 3 wherein said post is pivotally connected to said platform midway between a first and second side of said platform.

8. A stand according to claim 7, wherein said post is pivotally connected at said back end of said platform.

9. A stand according to claim 8 wherein said post comprises first and second telescoping tubes and means to lock said tubes in a relative fixed position.

10. A stand according to claim 1 further comprising means connected to said platform for engaging ends of said hunter's feet.

11. A stand according to claim 10 wherein said means for engaging said ends of said hunter's feet are first and second toe bars braced a distance above said platform.

12. A stand according to claim 11 wherein said toe bars angle upward and across said back end of said platform.

13. A stand according to claim 2 further comprising first and second slotted ears, each braced on a side of said platform and positioned to engage first and second ends of said cross bar respectively when said seat assembly is in an upright position, and means on said ends of said crossbar for engaging said slotted ears.

14. A stand according to claim 13, wherein each of said ears further comprise a circular opening centered on said slot and said means for engaging said slotted ears comprise a knob having a bolt extending outward and threaded into said end of said crossbar, said knob further having a bushing adjacent said ear engageable with said circular opening.

15. A stand according to claim 14 wherein said circular openings in said ears are positioned to lock said post at an angle of 90° to said platform when said bushings engage said circular openings.

16. A stand according to claim 1 wherein said traction means comprise a plurality of vertically aligned bars extending perpendicularly from an edge of said back end of said platform.

17. A stand according to claim 3 wherein said crossbar overlies a balance point of said stand when said seat assembly is in a collapsed position.

18. A hunting stand supportable by a climbing bar or a ladder, comprising:
    a platform having a front end and a back end, said back end having means for traction on a tree;
    first and second elongated arms;
    first and second receivers connected to opposite sides of said platform, said first and second receivers having upper means to engage said first and second arms respectively whereby said arms are supported in a position angled upward extending past said back end of said platform, said first and second receivers further having lower means to engage said first and second arms respectively, whereby said arms are supported in a position angled downward extending below said front end of said platform.

19. A hunting stand according to claim 18 wherein said upper and lower arm engaging means comprise sections of tubing.

20. A hunting stand according to claim 19 wherein said arms are slidable in said tubing.

21. A hunting stand according to claim 20 further comprising means to engage said arms and said climbing bar and means to engage said arms and said ladder.

22. A hunting stand according to claim 21 wherein said traction means comprise a plurality of vertically aligned bars extending perpendicularly from an edge of said back end of said platform.

23. A hunting stand convertible from a climbing stand to a ladder stand, comprising:
    a platform having a front end and a back end, said back end having means for traction on a tree;
    a first section of tubing connected to a side of said platform, said first tubing being angled upward from said front end to said back end of said platform, said first tubing having an upper end and a lower end;
    a second section of tubing connected to an opposite side of said platform, said second tubing being angled upward from said front end to said back end of said platform, said second tubing having an upper end and a lower end;
    a first arm having one of its ends matable with said upper end of said first tubing, and one of said ends matable with said lower end of said first tubing; and
    a second arm having one of its ends matable with said upper end of said second tubing, and one of said ends matable with said lower end of said second tubing.

24. A hunting stand according to claim 23 wherein said first and second arms are slidable within said first and second sections of tubing respectively.

25. A hunting stand according to claim 24 wherein each of said first and second section of tubing has holes spaced along its length and wherein each of said ends of said first and second arms matable with said first and second sections of tubing has a retractable pin engageable in said holes.

26. A hunting stand according to claim 24 further comprising a climbing bar having means for simultaneously engaging said first and second arms when said first and second arms are engaged with said upper ends of said first and second sections of tubing, respectively.

27. A hunting stand according to claim 24 further comprising a ladder having an upper end connected to said front end of said platform, said ladder having means for simultaneously engaging said first and second arms when said arms are engaged with said lower ends of said first and second sections of tubing respectively.

28. A stand convertible from a climbing stand to a ladder stand comprising:
a platform having a front end and a back end, said back end having means for traction on a tree;
a first climbing bar support connected to a side of said platform;
a second climbing bar support connected to an opposite side of said platform;
first and second arms engageable with said first and second climbing bar supports respectively, whereby said arms are supportable in a position angled upward relative to said platform and toward said back end of said platform;
a first ladder support connected to said side of said platform; and
a second ladder support connected to said opposite side of said platform whereby said first and second arms are engageable with said first and second ladder supports respectively and supportable in a position directed downward relative to said platform and towards a front end of said platform.

29. A hunting stand convertible from a ladder stand to a tripod stand, comprising:
a platform having a front end and a back end, said back end having means for traction against a tree;
a ladder having an upper end connected to said front end of said platform, and a lower end; and,
first and second leg sockets positioned adjacent said back end of said platform and accessible from below.

30. A hunting stand according to claim 29 further comprising a stabilizing bar having an end pivotally connected to said ladder between said upper and lower ends, an opposite end of said stabilizing bar having means to support said bar in a horizontal position against said tree.

31. A hunting stand according to claim 30, further comprising first and second legs having ends insertable into said first and second sockets respectively.

32. A hunting stand according to claim 31 wherein each of said first and second legs has a stabilizing arm having an end pivotally connected to said leg and an opposite end engageable with said opposite end of said stabilizing bar.

33. A hunting stand according to claim 32 wherein said opposite end of said stabilizing bar comprises a "Y" shaped connector and means to engage said opposite ends of said stabilizer arms.

34. A hunting stand according to claim 33 wherein said stabilizing bar comprises first and second telescoping tubes.

35. A hunting stand according to claim 34 wherein each of said first and second legs comprises means to adjust a length of said leg.

36. A hunting stand convertible from a ladder stand partially supported by a tree to a tripod stand partially supported by legs comprising:
a platform having a front end and a back end;
means to engage said back end of said platform with said tree;
a ladder having an upper end connected to said front end of said platform; and
means adjacent said back end of said platform for engaging an upper end of each of said legs.

37. A hunting stand according to claim 36 further comprising a stabilizing bar having an end pivotally connected to said ladder between said upper end and a lower end of said ladder, said stabilizing bar having an opposite end with means to support said bar in a horizontal position against said tree.

38. A hunting stand according to claim 37 wherein each of said legs comprise a stabilizing arm having an end pivotally connected to a side of said leg and an opposite end, and said opposite end of said stabilizing bar has means to engage said opposite ends of said stabilizing arms.

39. A hunting stand according to claim 37 wherein said stabilizing bar comprises first and second telescoping tubes.

* * * * *